United States Patent
Lu et al.

(10) Patent No.: US 11,064,358 B2
(45) Date of Patent: Jul. 13, 2021

(54) ONE-TIME-PASSWORD AUTHENTICATION METHOD AND DEVICE

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 288 days.

(21) Appl. No.: 16/092,500

(22) PCT Filed: Mar. 29, 2017

(86) PCT No.: PCT/CN2017/078542
§ 371 (c)(1),
(2) Date: Oct. 10, 2018

(87) PCT Pub. No.: WO2017/202136
PCT Pub. Date: Nov. 30, 2017

(65) Prior Publication Data
US 2019/0166496 A1 May 30, 2019

(30) Foreign Application Priority Data

May 24, 2016 (CN) .......................... 201610349335.3
May 24, 2016 (CN) .......................... 201610350413.1

(51) Int. Cl.
*H04L 9/00* (2006.01)
*H04W 12/069* (2021.01)
(Continued)

(52) U.S. Cl.
CPC .............. *H04W 12/069* (2021.01); *H04L 9/08* (2013.01); *H04L 9/0869* (2013.01); *H04L 9/32* (2013.01);
(Continued)

(58) Field of Classification Search
CPC ......... H04L 63/0838; H04L 9/32; H04L 9/08; H04L 9/0869; H04L 9/00; H04L 9/06;
(Continued)

(56) References Cited

U.S. PATENT DOCUMENTS 8,522,024 B2 * 8/2013 Lu .......................... H04L 9/3228
713/168
9,485,249 B2 * 11/2016 Jeal ....................... H04L 63/0853
(Continued)

*Primary Examiner* — Josnel Jeudy
(74) *Attorney, Agent, or Firm* — Hammer & Associates, P.C.

(57) ABSTRACT

A one-time-password authentication method, comprising the following steps: a client establishes NFC with an NFC dynamic token, obtains a token serial number of the NFC dynamic token and a one-time-password from the NFC dynamic token; the client encrypts the one-time-password by using the token serial number and a second random number stored by the client, to obtain a third ciphertext, and sends the third ciphertext, the second random number, and the token serial number to a token server; the client receives an authentication success message or an authentication failure message returned from an application server. By means of the present invention, the one-time-password generated by the NFC dynamic token is obtained by using an NFC channel, and the one-time-password is sent to the token server for authentication. Therefore, errors and leakage caused by a user by manually inputting the one-time-password is avoided, and the security of the dynamic token is improved.

9 Claims, 8 Drawing Sheets

(51) Int. Cl.
*H04L 9/32* (2006.01)
*H04L 9/08* (2006.01)
*H04L 29/06* (2006.01)
*H04W 12/03* (2021.01)
*H04W 12/47* (2021.01)
*H04W 12/06* (2021.01)

(52) U.S. Cl.
CPC ......... *H04L 63/0838* (2013.01); *H04W 12/03* (2021.01); *H04W 12/068* (2021.01); *H04W 12/47* (2021.01)

(58) Field of Classification Search
CPC ... H04W 12/03; H04W 12/068; H04W 12/47; H04W 12/069; G06F 21/60
USPC .......................................................... 713/168
See application file for complete search history.

(56) References Cited

U.S. PATENT DOCUMENTS

| | | | |
|---|---|---|---|
| 2012/0151566 A1* | 6/2012 | Lin | H04L 9/0838 726/7 |
| 2012/0210408 A1* | 8/2012 | Lu | H04L 63/0846 726/6 |
| 2014/0357187 A1 | 12/2014 | Ehrensvard | |
| 2017/0288872 A1* | 10/2017 | Lu | H04L 9/0869 |
| 2017/0293751 A1* | 10/2017 | Lu | H04L 9/3228 |
| 2017/0310487 A1* | 10/2017 | Lu | H04L 9/3228 |
| 2019/0132305 A1* | 5/2019 | Lu | H04L 63/0853 |
| 2019/0166496 A1* | 5/2019 | Lu | H04W 12/03 |
| 2019/0199723 A1* | 6/2019 | Tak | G06F 21/50 |
| 2020/0252399 A1* | 8/2020 | Hancock | H04L 63/029 |

* cited by examiner

ONE-TIME-PASSWORD AUTHENTICATION METHOD AND DEVICE

FIELD OF THE INVENTION

The present invention relates to a method for authenticating a dynamic password and a device therefor, which belongs to the field of information security.

PRIOR ART

A dynamic token is a device configured to generate dynamic passwords, which is widely applied to fields, such as E-bank, telecom operation and E-Government. Dynamic passwords generated by the dynamic token can be configured to authenticate identity to make identity authentication safer effectively.

In prior art, a user need to enter manually a dynamic password in a website or a client after the dynamic password is generated, in this case, the user may make a mistake and it is not safe enough for the user.

SUMMARY OF THE INVENTION

The object of the present invention is to provide a method for authenticating a dynamic password and a device therefor, by which a dynamic password generated by a NFC dynamic token is obtained via a NFC channel, and the dynamic password is sent to a token server for being authenticated, in this way, the dynamic token is with more security because the method avoids a mistake made by the user or the password form being leaking when the user manually enters a dynamic password.

Thus, according to the first aspect of the present invention, there is provided a method for authenticating a dynamic password, which includes following steps:

building, by a client, a NFC communication with a NFC dynamic token, obtaining a token serial number of the NFC dynamic token and a dynamic password from the NFC dynamic token;

encrypting, by the client, the dynamic password by using the token serial number and a second random number saved by the client so as to obtain a third cipher text, and sending the third cipher text, the second random number and the token serial number to the token server; and receiving, by the client, information of authenticating successful or information of authenticating unsuccessful returned from an application server.

According to the second aspect of the present invention, there is provided a method for authenticating a dynamic password, which includes following steps:

receiving, by the token server, the third cipher text, the second random number and the token serial number from the client, and decoding the third cipher text by using the token serial number and the second random number so as to obtain the dynamic password; and searching, by the token server, for a corresponding torrent file according to the token serial number, and authenticating the dynamic password by using the torrent file searched, sending the information of authenticating successful to the application server in the case that the dynamic password is authenticated successfully; sending the information of authenticating unsuccessful to the application server in the case that the dynamic password is authenticated unsuccessfully.

According to the third aspect of the present invention, there is provided a client, which include:

a communication module which is configured to build the NFC communication with the NFC dynamic token;

a first obtaining module which is configured to obtain the token serial number of the NFC dynamic token;

a second obtaining module which is configured to obtain the dynamic password from the NFC dynamic token;

a storing module which is configured to save the second random number;

an encryption module which is configured to encrypt the dynamic password by using the token serial number and the second random number so as to obtain the third cipher text;

a sending module is configured to send the third cipher text, the second random number and the token serial number to the token server; and a receiving module which is configured to receive the information of authenticating successful or the information of authenticating unsuccessful returned from the application server.

According to the fourth aspect of the present invention, there is provided a token server, which includes:

a receiving module which is configured to receive the third cipher text, the second random number and the token serial number from the client;

a decoding module which is configured to decode the third cipher text by using the token serial number and the second random number so as to obtain the dynamic password;

a searching module which is configured to searching the corresponding torrent file according to the token serial number;

an authenticating module which is configured to authenticate the dynamic password by using the torrent file searched by the searching module; and a sending module which is configured to send the information of authenticating successful to the application server after the dynamic password is authenticated successfully by the authenticating module; and send the information of authenticating unsuccessful to the application server after the dynamic password is authenticated unsuccessfully by the authenticating module.

According to the present invention, it also provides a method for writing a seed key in a NFC dynamic token and a device thereof which can overcome drawbacks in flexibility of the dynamic token and security in prior art.

According to the fifth aspect of the present invention, there is provided a method for writing a seed key in a NFC dynamic token, which includes following steps:

obtaining, by the client, the token serial number of the NFC dynamic token, and receiving a first random number from the NFC dynamic token, generating the second random number, and saving the token serial number and the second random number, and sending the token serial number, the first random number and the second random number to the token server;

receiving, by the client, a second cipher text from the token server, decoding the second cipher text by using the token serial number latest saved and the second random number so as to obtain a first cipher text and a check value; and sending, by the client, the first cipher text and the check value to the NFC dynamic token.

According to the sixth aspect of the present invention, there is also provided a method for writing a seed key in the NFC dynamic token, which includes following steps:

receiving, by the token server, the token serial number, the first random number and the second random number from the client;

generating, by the token server, a torrent file according to the token serial number, binding the torrent file to the token serial number, and generating the check value according to the torrent file, and encrypting the torrent file by using the first random number to obtain the first cipher text; and encrypting, by the token server, the first cipher text and the check value by using the second random number and the token serial number to obtain a second cipher text, and sending the second cipher text to the client.

According to the eighth aspect of the present invention, it also provides a client, which includes:

an obtaining module which is configured to obtain the token serial number of the NFC dynamic token;

a first receiving module which is configured to receive the first random number from the NFC dynamic token;

a first generating module which is configured to generate the second random number;

a storing module which is configured to save the token serial number and the second random number;

a first sending module which is configured to send the token serial number, the first random number and the second random number to the token server;

a second receiving module which is configured to receive the second cipher text from the token server;

a decoding module which is configured to decode the second cipher text by using the token serial number latest saved and the second random number so as to obtain the first cipher text and the check value; and a second sending module which is configured to send the first cipher text and the check value to the NFC dynamic token.

According to the ninth aspect of the present invention, it also provides a token server, which includes:

an obtaining module which is configured to receive the token serial number, the first random number and the second random number from the client;

a first generating module which is configured to generate the torrent file according to the token serial number;

a binding module which is configured to bind the torrent file to the token serial number;

a second generating module which is configured to generate a check value according to the torrent file;

a first encryption module which is configured to encrypting the torrent file by using the first random number so as to obtain the first cipher text;

a second encryption module which is configured to encrypt the first cipher text and the check value by using the second random number and the token serial number so as to obtain the second cipher text; and a sending module which is configured to send the second cipher text to the client.

According to the present invention, it makes the dynamic token safer (with more security) and more flexible that writing a seed key in a NFC dynamic token via a NFC channel; and a dynamic password generated by the NFC dynamic token is obtained via the NFC channel and the dynamic password is sent to the token server for authentication, in this way, it avoids an error of the dynamic password and prevents the dynamic password from being leaked when the user manually enters the password, and it makes the dynamic token safer.

DETAILED DESCRIPTION OF ACCOMPANYING DRAWINGS

DETAILED DESCRIPTION OF THE INVENTION

The technical solution in the Embodiment of the present invention is further described more clearly and completely with the drawings of the present invention. Apparently, Embodiments described herein are just a few Embodiments of the present invention. On the basis of Embodiments of the invention, all other related Embodiments made by those skilled in the art without any inventive work belong to the scope of the invention.

Figure 1:
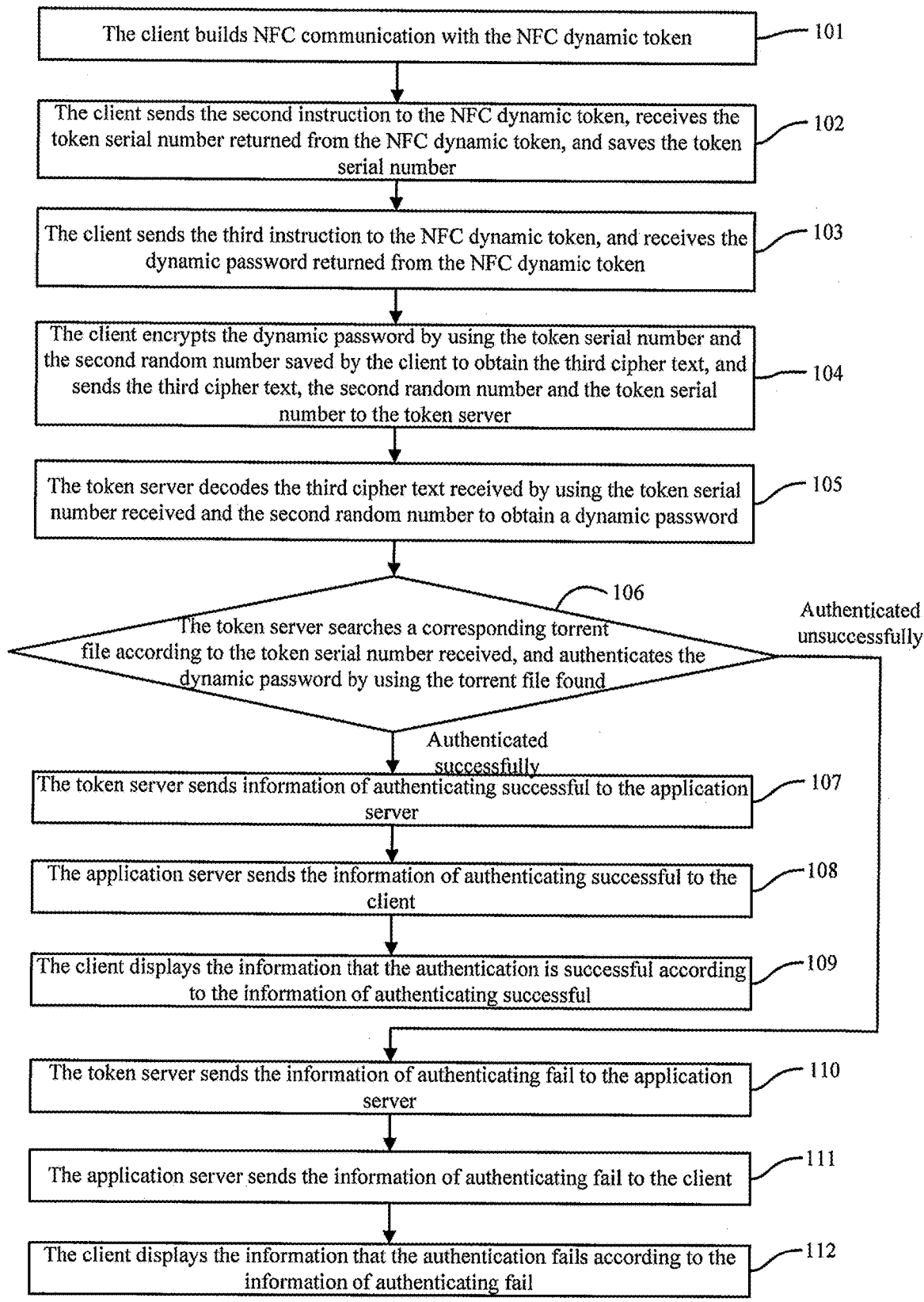
FIG. 1 shows a flow diagram of the method for authenticating a dynamic password according to Embodiment 1 of the present invention.

It provides a method for authenticating a dynamic password according to Embodiment 1 of the present invention, as shown in FIG. 1, which includes the following steps:

Step 101, a client builds a NFC communication with the NFC (Near Field Communication) dynamic token.

Step 102, the client sends a second instruction to the NFC dynamic token, and receives a token serial number returned from the NFC dynamic token, and saves the token serial number.

For instance, the second instruction sent by the client to the NFC dynamic token is "0x4402043A", the token serial number returned from the NFC dynamic token which is received is "15357".

Step 103, the client sends a third instruction to the NFC dynamic token, and receives a dynamic password returned from the NFC dynamic token.

For instance, the third instruction sent from the client to the NFC dynamic token is "0x44020110", the dynamic password returned from the NFC dynamic token which is received is "355569".

Step 104, the client encrypts the dynamic password by using the token serial number and a second random number saved by the client so as to obtain a third cipher text, and send the third cipher text, the second random number and the token serial number to a token server.

Specifically, the client generates an encryption key according to the second random number saved by the client, and generates an initialization vector according to the token serial number, and encrypts the dynamic password by using the encryption key and the initialization vector so as to obtain the third cipher text.

In Embodiment 1, the client calculates a hash on the second random number and a preset value to obtain a hash value which is made as the encryption key; and the client calculates hash on the token serial number and the preset value to obtain a hash value which is made as the initialization vector. In this case, the second random number can be a number of seconds of utc.

For instance, the clients encrypts the dynamic password which is 355569 by using the second random number which is 0x297A and the token serial number which is 15357 so as to obtain the third cipher text which is D465A1, and sends the third cipher text D465A1, the second random number 0x297A and the token serial number 15357 to the token server.

Step 105, the token server decodes the third cipher text by using the token serial number and the second random number which are received to obtain a dynamic password.

Specifically, the token server generates the encryption key according to the second random number received, and generates the initialization vector according to the token serial number received, and decodes the third cipher text by using the encryption key and the initialization vector so as to obtain the dynamic password.

In Embodiment 1, the token server can calculate hash on the second random number received and the preset value to obtain a hash value which is made as the encryption key; the token server calculates hash on the token serial number received and the preset value to obtain a hash value which is made as the initialization vector.

For instance, the token server decodes the third cipher text D465A1 by using the token serial number 15357 and the second random number 0x297A so as to obtain the dynamic password 355569.

Step 106, the token server searches a corresponding torrent file according to the token serial number received, and authenticates the dynamic password obtained by using the torrent file which is searched, and goes to Step 107 in the case that the dynamic password is authenticated successfully; goes to Step 110 in the case that the dynamic password is authenticated unsuccessfully.

For instance, the token server searches the corresponding torrent file which is 0x8D5828922FEBFC8597 according to the token serial number received which is 15357, and authenticates the dynamic password 355569 by using the torrent file.

Step 107, the token server sends the information of authenticating successful to the application server.

Step 108, the application server sends the information of authenticating successful to the client.

Step 109, the client displays the information of authenticating successful according to the information of authenticating successful received.

Step 110, the token server sends the information of authenticating unsuccessful to the application server.

Step 111, the application server sends the information of authenticating unsuccessful to the client.

Step 112, the client displays the information of authenticating unsuccessful according to the information of authenticating unsuccessful received.

According to the Embodiment 1, a dynamic password generated by the NFC dynamic token is obtained via the NFC channel, and the dynamic password is sent to the token server for authentication, in this way, it avoids an error of the dynamic password and prevents the dynamic password from being leaked when the user manually enters the password, and it makes the dynamic token safer.

Figure 2:
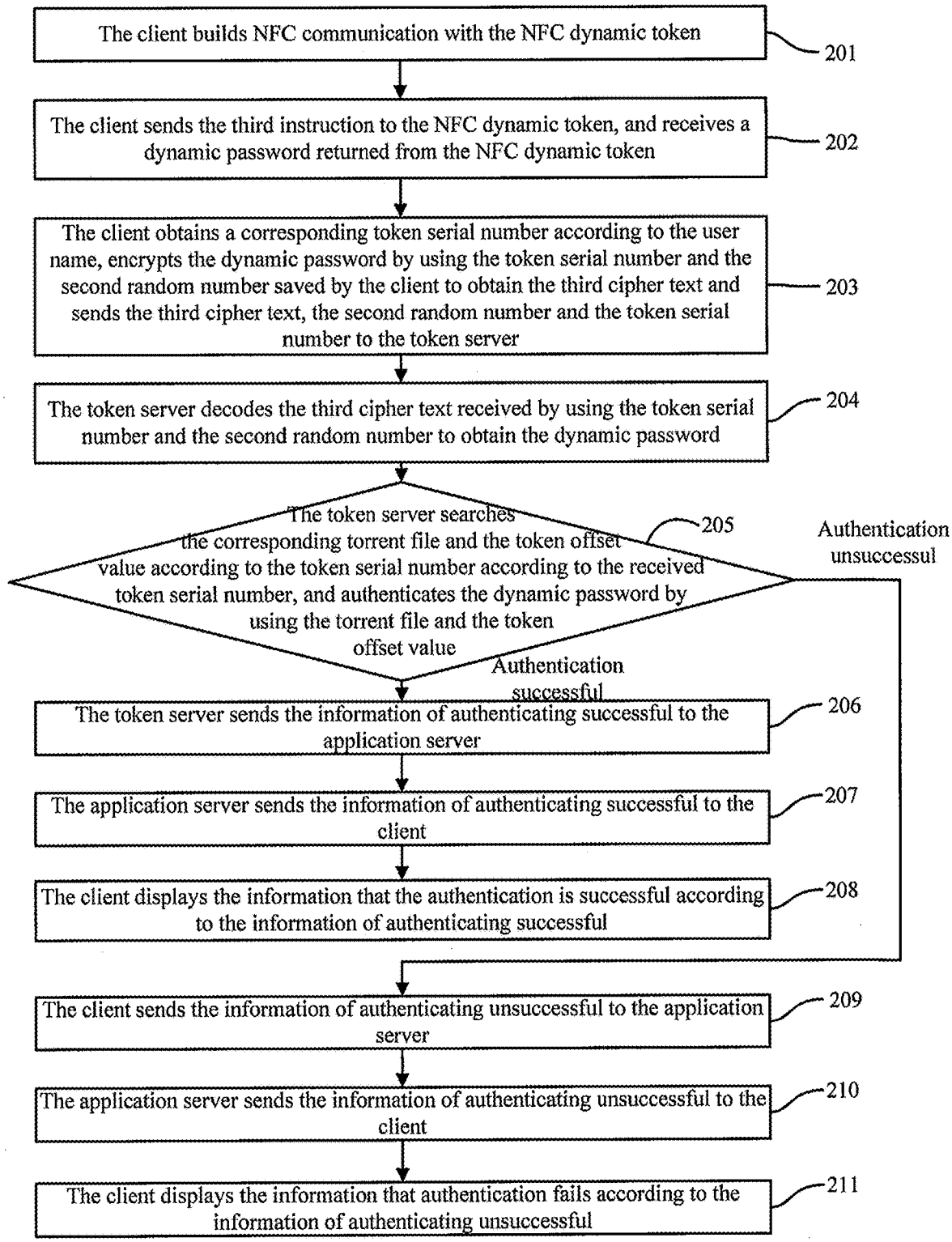
FIG. 2 shows a flow diagram of the other method for authenticating a dynamic password according to Embodiment 2 of the present invention.

It provides another method for authenticating a dynamic password according to Embodiment 2 of the present invention, as shown in FIG. 2, which includes the following steps:

Step 201, the client builds the NFC communication with the NFC dynamic token.

Step 202, the client sends a third instruction to the NFC dynamic token, and receives a dynamic token returned from the NFC dynamic token.

For instance, the client sends the third instruction which is 0x44020110 to the NFC dynamic token, and receives the dynamic password which is 355569 returned from the NFC dynamic token.

Step 203, the client obtains a corresponding token serial number according a user name, and encrypts the dynamic password by using the token serial number and the second random number saved by the client so as to obtain the third cipher text, and sends the third cipher text, the second random number and the token serial number to the token server.

Specifically, the client generates the encryption key according to the second random number saved by the client, generates the initialization vector according to the token serial number, and encrypts the dynamic password by using the encryption key and the initialization vector to obtain the third cipher text.

In Embodiment 2, the client can calculate hash on the second random number and a preset value to obtain a hash value which is made as the encryption key; the client calculates hash on the token serial number and the preset value to obtain a hash value which is made as the initialization vector. In this case, the second random number can be a number of seconds of utc.

For instance, the client obtains the corresponding token serial number "15357" according to the user name "admin", and encrypts the dynamic password "3555569" by using the second random number "0x297A" and the token serial number "15357" to obtain the third cipher text which is D465A1, and sends the third cipher text "D465A1", the second random number "0x297A" and the token serial number "15357" to the token server.

Step 204, the token server decodes the third cipher text received by using the token serial number and the second random number received so as to obtain the dynamic password.

Specifically, the token server generates the encryption key according to the second random number received, and generates the initialization vector according to the token serial number received, and decodes the third cipher text by using the encryption key and the initialization vector to obtain the dynamic password.

In Embodiment 2, the token server could calculate a hash on the second random number received and the preset value to obtain the hash value which is made as the encryption key; the token server calculates a hash on the token serial number received and the preset value so as to obtain a hash value which is made as the initialization vector.

For instance, the token server decodes the third cipher text "D465A1" by using the token serial number received "15357" and the second random number "0x297A" to obtain the dynamic password "355569".

Step 205, the token server searches the corresponding torrent file and a token offset value according to the token serial number received, and authenticates the dynamic password obtained by being decoded by using the torrent file and the token offset value obtained, and goes to Step 206 in the case that the dynamic password is authenticated successfully; otherwise, goes to Step 209.

For instance, the corresponding torrent file and the token offset value which are found by the token server according to the token serial number received "15357" is "0x8D5828922FEBFC8597" and "254" respectively, and the token server authenticates the dynamic password "355569" obtained by being decoded by using the torrent file and the token offset value.

Step 206, the token server sends the information of authenticating successful to the application server.

Step 207, the application server sends the information of authenticating successful to the client.

Step 208, the client displays the information of authenticating successful according to the information of authenticating successful received.

Step 209, the token server sends the information of authenticating unsuccessful to the application server.

Step 210, the application sends the information of authenticating unsuccessful to the client.

Step 211, the client displays the information of authenticating unsuccessful according to the information of authenticating unsuccessful received.

It makes the dynamic token safer because the dynamic password generated by the NFC dynamic token is sent to a mobile device via the NFC channel according to Embodiment 2 of the present invention, in this way, it avoid error and the dynamic password from being leaked when a user enters the dynamic password.

It needs to be noted that the client can also obtain a token serial number entered by a user, and encrypt the dynamic password by using the token serial number and the second random number saved by the client to obtain the third cipher text, and send the third cipher text, the second random number and the token serial number to the token server in other Embodiments of the present invention, thus, the object of the invention can be realized.

For instance, the client obtains the token serial number "15357" entered by the user, and encrypts the dynamic password 355569 by using the second random number "0x297A" and the token serial number "15357" to obtain the third cipher text "D465A1", and sends the third cipher text "D465A1", the second random number "0x297A" and the token serial number "15357" to the token server.

Besides, the token server can update the token offset value after authenticating the dynamic password by using the torrent file and the token offset value.

According to the Embodiment 2, a dynamic password generated by the NFC dynamic token is obtained via the NFC channel, and the dynamic password is sent to the token server for authentication, in this way, it avoids an error of the dynamic password and prevents the dynamic password from being leaked when the user manually enters the password, and it makes the dynamic token safer.

Figure 3:
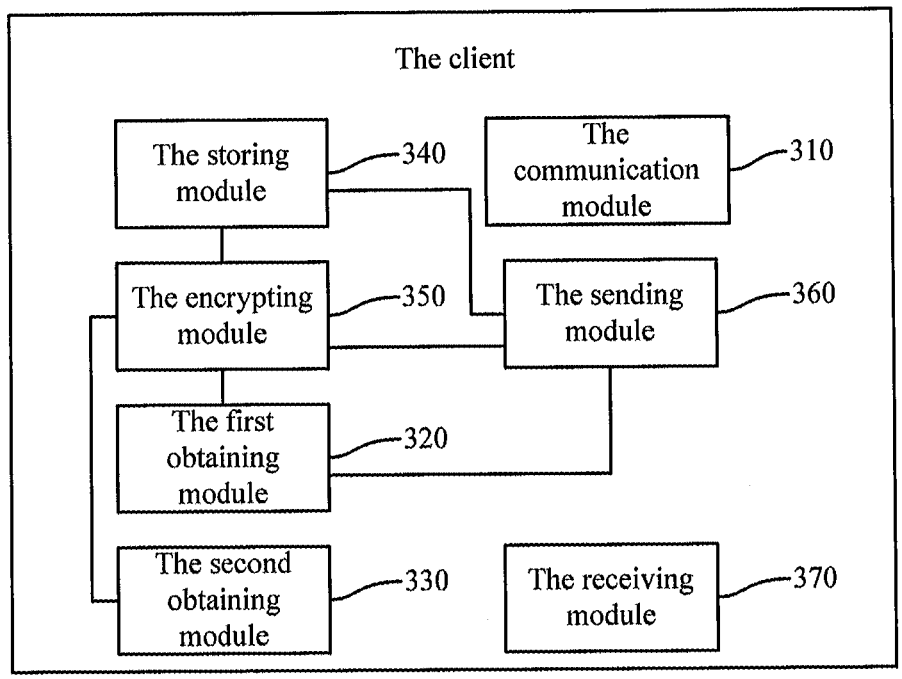
FIG. 3 shows a structure diagram of a client according to Embodiment 3 of the present invention.

It provides a client based on the above method for authenticating the dynamic password according to Embodiment 3 of the present invention, as shown in FIG. 3, the client includes:

a communication module 310 which is configured to build a NFC communication with the NFC dynamic token;

a first obtaining module 320 which is configured to obtain the token serial number of the NFC dynamic token;

a second obtaining module 330 which is configured to obtain a dynamic password from the NFC dynamic token;

a storing module 340 which is configured to save the second random number;

an encryption module 350 which is configured to encrypt the dynamic password by using the token serial number and the second random number to obtain the third cipher text;

a sending module 360 which is configured to send the third cipher text, the second random number and the token serial number to the token server;

a receiving module 370 which is configured to receive the information of authenticating successful or the information of authenticating unsuccessful returned from the application server.

Specifically, the first obtaining module 320 is specifically configured to send the second instruction to the NFC dynamic token, and receive the token serial number returned from the NFC dynamic token; or obtain the corresponding token serial number according to the user name.

Furthermore, the encryption module 350, includes:

a first generating sub-module which is configured to generate the encryption key according to the second random number;

a second generating sub-module which is configured to generate the initialization vector according to the token serial number; and an encryption sub-module which is configured to encrypt the dynamic password by using the encryption key and the initialization vector to obtain the third cipher text.

Furthermore, the first generating sub-module is specifically configured to calculate a hash on the second random number and the preset value to obtain the hash value which is made as the encryption key; and the second generating sub-module is specifically configured to calculate a hash on the token serial number and the preset value to obtain the hash value which is made as the initialization vector.

Furthermore, the second obtaining module 330 is specifically configured to send the third instruction to the NFC dynamic token, and receive the dynamic password returned from the NFC dynamic token.

According to the Embodiment 3, a dynamic password generated by the NFC dynamic token is obtained via the NFC channel, and the dynamic password is sent to the token server for authentication, in this way, it avoids an error of the dynamic password and prevents the dynamic password from being leaked when the user manually enters the password, and it makes the dynamic token safer.

Figure 4:
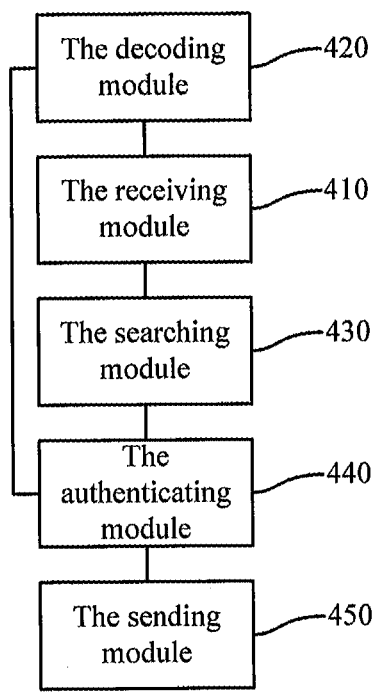
FIG. 4 shows a structure diagram of a token server according to Embodiment 4 of the present invention.

It provides a token server base on the above method for authenticating a dynamic password according to Embodiment 4 of the present invention, as shown in FIG. 4, the token server includes:

a receiving module 410 which is configured to receive the third cipher text, the second random number and the token serial number from the client;

a decoding module 420 which is configured to decode the third cipher text by using the token serial number and the second random number to obtain a dynamic password;

a searching module 430 which is configured to search the corresponding torrent file according to the token serial number;

an authenticating module 440 which is configured to authenticate the dynamic password by using the torrent file found by the searching module; and a sending module 450 which is configured to send the information of authenticating successful to the application server after the dynamic password is authenticated successfully by the authenticating module; to send the information of authenticating unsuccessful to the application server after the dynamic password is authenticated unsuccessfully by the authenticating module.

Specifically, the searching module 430 is specifically configured to search the corresponding torrent file and the token offset value according to the token serial number;

correspondingly, the authenticating module 440 is specifically configured to authenticate the dynamic password by using the torrent file and the token offset value found by the searching module.

Furthermore, the encryption module 420 includes:

a first generating sub-module which is configured to generate the encryption key according to the second random number;

a second generating sub-module which is configured to generate the initialization vector according to the token serial number; and a decoding sub-module which is configured to decode the third cipher text by using the encryption key and the initialization vector so as to obtain the dynamic password.

Furthermore, the first generating sub-module is specifically configured to calculate a hash on the second random number and the preset value to obtain the hash value which is made as the encryption key.

The second generating sub-module is specifically configured to calculate a hash on the token serial number and the preset value to obtain the hash value which is made as the initialization vector.

Figure 5:
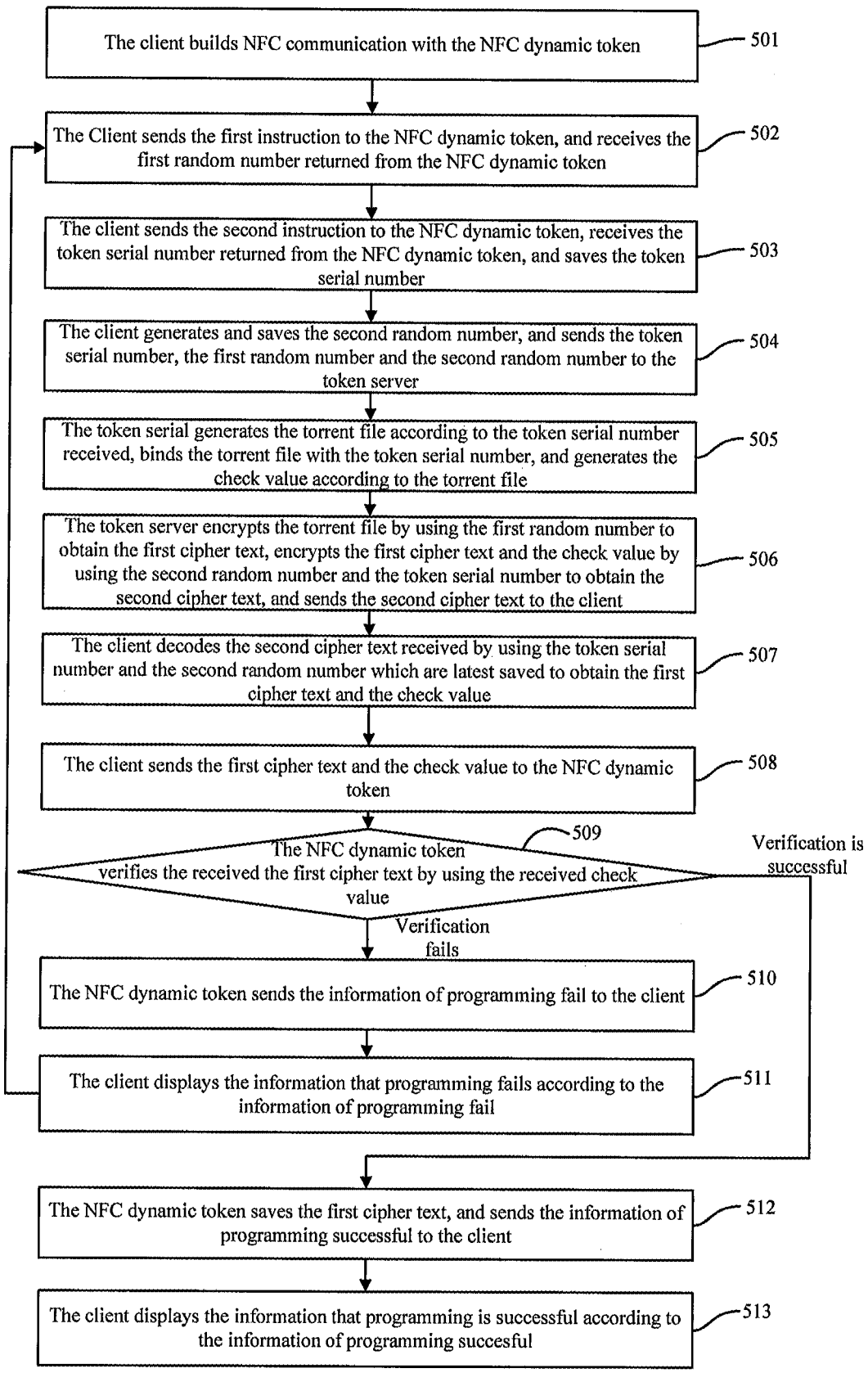
FIG. 5 shows a flow diagram of a method for writing a seed key in the NFC dynamic token according to Embodiment 5 of the present invention.

It provides a method for writing a seed key in a NFC dynamic token according to Embodiment 5 of the present invention, as shown in FIG. 5, which includes:

Step 501, the client builds the NFC communication with the NFC dynamic token.

In this case, the client can be installed in a device which is with NFC function.

Step 502, the client sends a first instruction to the NFC dynamic token, and receives a first random number returned from the NFC dynamic token.

In this case, the first random number could be part of data cut by the NFC dynamic token out from the number of seconds of utc, for instance, the first instruction sent by the client to the NFC dynamic token is 0x44020110, the received first random number returned by the NFC dynamic token is 0x1326.

It needs to note that the NFC dynamic token may save the first random number.

Step 503, the client sends a second instruction to the NFC dynamic token, and receives the token serial number returned from the NFC dynamic token, and saves the token serial number.

For instance, the second instruction sent by the client to the NFC dynamic token is 0x4402043A, the received token serial number returned from the NFC dynamic token is 15357.

It needs to note that the client can also obtain the corresponding token serial number according to the user name.

Step 504, the client generates and saves the second random number, and sends the token serial number, the first random number and the second random number to the token server.

In this case, the second random number can be the number of seconds of utc or a part of data cut out from the number of seconds of UTC.

For instance, the client generates and saves the second random number which is 0x297A, and sends the token serial number "15357", the first random number "0x1326" and the second random number "0x297A".

Step 505, the token server generates the torrent file according to the received token serial number, and binds the torrent file with the token serial number, and generates a check value according to the torrent file.

For instance, the token server generates the torrent file which is 0x8D5828922FEBFC8597 according to the token serial number 15357, and binds the torrent file "0x8D5828922FEBFC8597" with the token serial number "15357", and generates the check value which is 0x6E4D according to the torrent file.

Step 506, the token server encrypts the torrent file by using the first random number to obtain the first cipher text, and encrypts the first cipher text and the check value by using the second random number and the token serial number to obtain the second cipher text, and sends the second cipher text to the client.

Specifically, the token serial generates the encryption key according to the second random number, and generates the initialization vector according to the token serial number, and encrypts the first cipher text and the check value by using the encryption key and the initialization vector to obtain the second cipher text.

In Embodiment 5, the token server can calculate a hash on the second random number and the preset value to obtain the hash value which is made as the encryption key; the token server calculate a hash on the token serial number and the preset value to obtain the hash value which is made as the initialization vector.

For instance, the token server encrypts the torrent file "0x8D5828922FEBFC8597" by using the first random number "0x1326" which is from the client to obtain the first cipher text "0xAFCC4F6EAC971346E6", and encrypts the first cipher text "0xAFCC4F6EAC971346E6" and the check value "0x6E4D" by using the second random number "0x297A" and the token serial number "15357" to obtain the second cipher text "0xD2361E54C863BD21CA".

Step 507, the client decodes the second cipher text received by using the token serial number which is latest saved and the second random number so as to obtain the first cipher text and the check value.

Specifically, the client generates the encryption key according to the second random number which is latest saved, and generates the initialization vector according to the token serial number which is latest saved, and decodes the second cipher text by using the encryption key and the initialization vector so as to obtain the first cipher text.

In Embodiment 5, the client can calculate a hash on the second random number which is latest saved and the preset value to obtain the hash value which is made as the encryption key; the client calculates a hash on the token serial number which is latest saved and the preset value to obtain a hash value which is made as the initialization vector.

For instance, the client decodes the second cipher text "0xD2361E54C863BD21CA" by using the token serial number "15357" and the second random number "0x297A" to obtain the first cipher text "0xAFCC4F6EAC971346E6" and the check value "0x6E4D".

Step 508, the client sends the first cipher text and the check value to the NFC dynamic token.

For instance, the client sends the first cipher text "0xAFCC4F6EAC971346E6" and the check value "0x6E4D" to the NFC dynamic token.

Step 509, the NFC dynamic token verifies the first cipher text by using the received check value, goes to Step 510 in the case that the first cipher text is verified unsuccessfully; goes to Step 512 in the case that the first cipher text is verified unsuccessfully.

Specifically, the NFC dynamic token decodes the first cipher text received by using the first random number which is latest saved to obtain a torrent file, and calculates to obtain a check value according to the torrent file, and determining whether the check value obtained by calculating is same as the check value received, if yes, the verification is successful; otherwise, the verification fails.

For instance, the check value received by the NFC dynamic token is 0x6E4D, the NFC dynamic token decodes the first cipher text "0xAFCC4F6EAC971346E6" by using the first random number "0x1326" which is latest saved to obtain the torrent file "0x8D5828922FEB9 FC857", and calculates to obtain the check value according to the torrent file, the verification is successful in the case that the check value obtained is "0x6E4D"; otherwise the verification is unsuccessful.

Step 510, the NFC dynamic token sends information of writing-in fail to the client.

For instance, the information of writing-in fail sent by the NFC dynamic token to the client is 0xBB023D5B.

Step 511, the client displays the information of writing-in fail according to the received information of writing-in information, and returns to Step 502.

Step 512, the NFC dynamic token saves the first cipher text, and sends information of writing-in successful to the client.

It needs to note that the NFC dynamic token can decodes the first cipher text by using the first random number which is latest saved after the NFC dynamic token saves the first cipher text to obtain the torrent file, and generates the dynamic password by using the torrent file.

For instance, the NFC dynamic token saves the first cipher text "0xAFCC4F6EAC971346E6", and sends the information of writing-in successful "0xBB02CCCC" to the clients via the NFC channel.

Step 513, the client displays the information that writing-in is successful according to the information of writing-in successful.

In Embodiment 5, the seed key is written in the NFC dynamic token via the NFC channel, in this way, the dynamic token is safer and more flexible.

Figure 6:
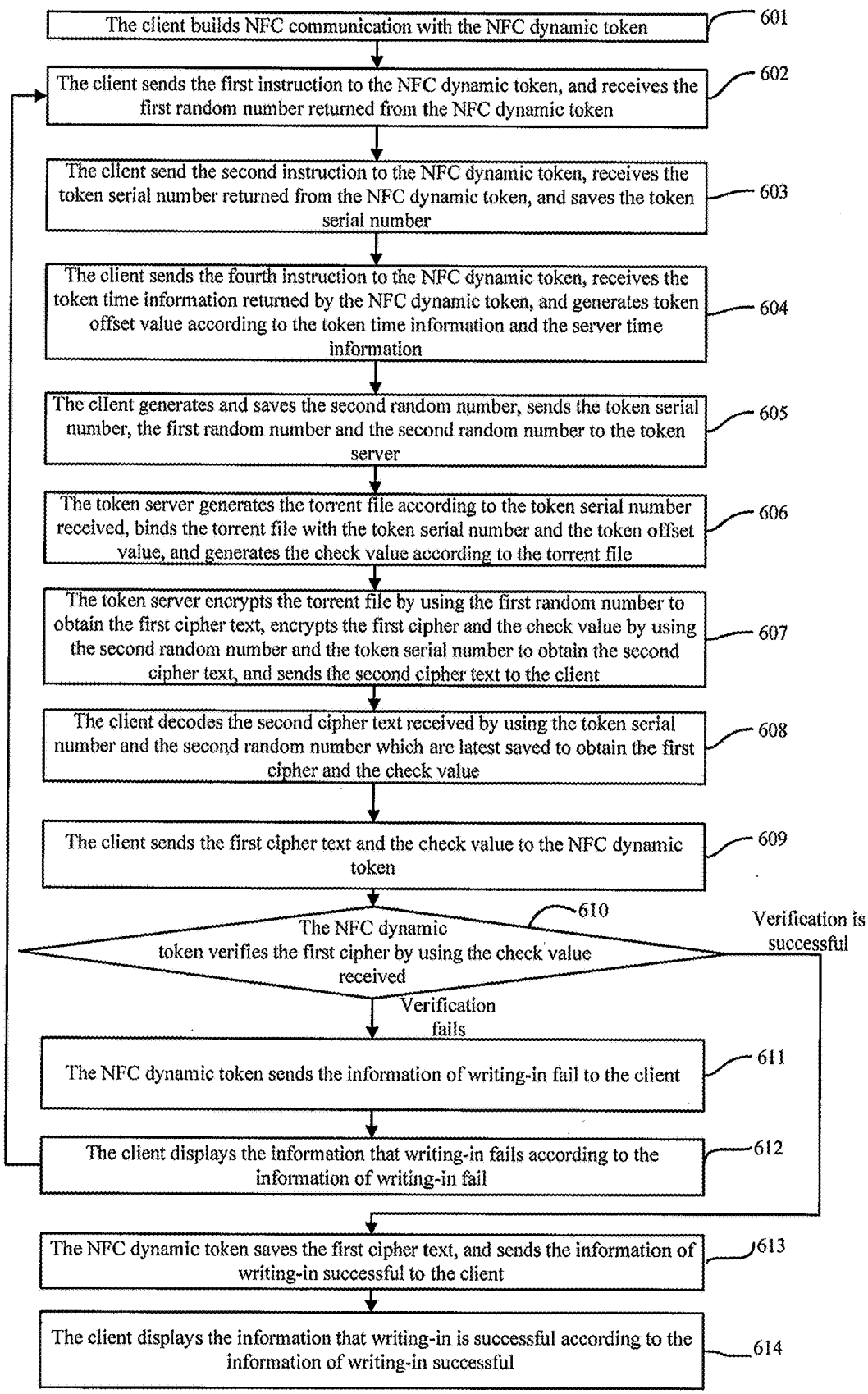
FIG. 6 shows a flow diagram of another method for writing a seed key in the NFC dynamic token according to Embodiment 6 of the present invention.

It provides another method for writing a seed key into a NFC dynamic token according to Embodiment 6 of the present invention, as shown in FIG. 6, which includes following steps:

Step 601, the client builds NFC communication with the NFC dynamic token.

In this case, the client can be equipped in a device with NFC function.

Step 602, the client sends a first instruction to the NFC dynamic token, and receives a first random number returned from the NFC dynamic token.

In this case, the first random number can be part of data cut out from the number of seconds of UTC by the NFC dynamic token, for instance, the client sends the first instruction "0x44020110" to the NFC dynamic token, and receives the first random number "0x1326" returned from the NFC dynamic token.

It needs to note that the NFC dynamic token saves the first random number.

Step 603, the client sends a second instruction to the NFC dynamic token, and receives a token serial number returned from the NFC dynamic token, and saves the token serial number.

For instance, the client sends the second instruction "0x4402043A" to the NFC dynamic token, receives the token serial "15357" returned from the NFC dynamic token.

Step 604, the client sends a fourth instruction to the NFC dynamic token, receives token time information returned from the NFC dynamic token, and generates a token offset value according to the token time information and server time information.

In this case, the token time information can be the number of minutes which is saved by the NFC dynamic token, and the number of minutes is configured to calculate a dynamic password.

For instance, the client sends the fourth instruction "0x4402057B" to the NFC dynamic token, receives the token time information "254" returned from the NFC dynamic token, and generates the token offset value "4".

Step 605, the client generates and saves the second random number, and sends the token serial number, the token offset value, the first random number and the second random number to the token server.

In this case, the second random number can be the number of seconds of UTC or part of the data cut out from the number of seconds of UTC.

For instance, the client generates and saves the second random number "0x297A", and sends the token serial number "15357", the token offset value "4", and the first random number "0x1326" and the second random number "0x297A" to the token server.

Step 606, the token server generates the torrent file according to the received token serial number, binds the torrent file with the token serial number and the token offset value, and generates the check value according to the torrent file.

For instance, the token server generates the torrent file "0x8D5828922FEBFC8597" according to the token serial number "15357", and binds the torrent file "0x8D5828922FEBFC8597" with the token serial number "15357" and the token offset value "4", and generates the check value "0x6E4D" according to the torrent file.

Step 607, the token server encrypts the torrent file by using the first random number to obtain the first cipher text, and encrypts the first cipher text and the check value by using the second random number and the token serial number to obtain the second cipher text, and sends the second cipher text to the client.

Specifically, the token server generates encryption key according to the second random number, and generates the initialization vector according to the token serial number, and encrypts the first cipher text and the check value by using the encryption key and the initialization vector to obtain the second cipher text.

In Embodiment 6, the token server calculates a hash on the second random number and the preset value to obtain the hash value which is made as the encryption key; the token server calculates a hash on the token serial number and the preset value to obtain the hash value which is made as the initialization vector.

For instance, the token server encrypts the torrent file "0x8D5828922FEBFC8597" by using the first random number "0x1326" to obtain the first cipher text "0xAFCC4F6EAC971346E6", and encrypts the first cipher text "0xAFCC4F6EAC971346E6" and the check value "0x6E4D" by using the second random number "0x267A" and the token serial number "15357" to obtain the second cipher text "0xD2361E54C863BD21CA".

Step 608, the client decodes the received second cipher text by using the token serial number and the second random number which are latest saved to obtain the first cipher text and the check value.

Specifically, the client generates the encryption key according to the second random number which is latest saved, and generates the initialization vector according to the token serial number which is latest saved, and decodes the second cipher text received by using the encryption key and the initialization vector to obtain the first cipher text and the check value.

In Embodiment 6, the client can calculate a hash on the second random number which is latest saved and the preset value to obtain the hash value which is made as the encryption key; and the client can calculate a hash on the token serial number which is latest saved and the preset value to obtain the hash value which is made as the initialization vector.

For instance, the client decodes the second cipher text "0xD2361E54C863BD21CA" by using the token serial number "15357" and the second random number "0x297A" to obtain the first cipher text "0xAFCC4F6EAC971346E6" and the check value "0x6E4D".

Step 609, the client sends the first cipher text and the check value to the NFC dynamic token.

For instance, the client sends the first cipher text "0xAFCC4F6EAC971346E6" and the check value "0x6E4D" to the NFC dynamic token.

Step 610, the NFC dynamic token verifies the first cipher text by using the check value received, goes to Step 611 in the case that the first cipher text is verified unsuccessfully; goes to Step 613 in the case that the first cipher text is verified successfully.

Specifically, the NFC dynamic token decodes the first cipher text received by using the first random number which is latest saved to obtain the torrent file, and calculates to obtain the check value according to the torrent file, and determines whether the check value obtained is same as the check value received, is yes, the first cipher text is verified successfully; otherwise, the first cipher text is verified unsuccessfully.

For instance, the NFC dynamic token receives the check value "0x6E4D", and decodes the first cipher text "0xAFCC4F6EAC971346E6" by using the first random number "0x1326" which is the latest saved to obtain the torrent file "0x8D5828922FEBFC8597", and calculates to obtain the check value, and the first cipher text is verified successfully in the case that the check value obtained is "0x6E4D"; otherwise, the first cipher text is verified unsuccessfully.

Step 611, the NFC dynamic token sends the information of writing-in fail to the client.

For instance, the NFC dynamic token sends the information of writing-in fail 0Xbb023D5B" to the client.

Step 612, the client displays the information that writing-in fails according to the received information of writing-in fail, and returns to Step 602.

Step 613, the NFC dynamic token saves the first cipher text, and sends the information of writing-in successful to the client.

It needs to note that the NFC dynamic token could decode the first cipher text by using the first random number which is latest saved after the first cipher text is saved by the NFC dynamic token to obtain the torrent file, and generates the dynamic password by using the torrent file.

For instance, the NFC dynamic token saves the first cipher text "0xAFCC4F6EAC971346E6", and sends the information of writing-in successful "0xBB02CCCC" to the client via the NFC channel.

Step 614, the client displays the information that writing-in is successful according to the information of writing-in successful.

In Embodiment 6, the seed key is programmed into the NFC dynamic token via the NFC channel, in this way, the dynamic token is safer and more flexible.

It needs to note that the NFC dynamic token can also save the torrent file which is obtained by decoding the first cipher text after the first cipher text is verified successfully by the check value received in other embodiments, in this way, the object of the present invention can also be realized.

For instance, the NFC dynamic token saves the torrent file "0x8D5828922FEBFC8597" by decoding the first cipher text after the first cipher text "0xAFCC4F6EAC971346E6" is verified successfully by using the check value "0x6E4D" received.

Figure 7:
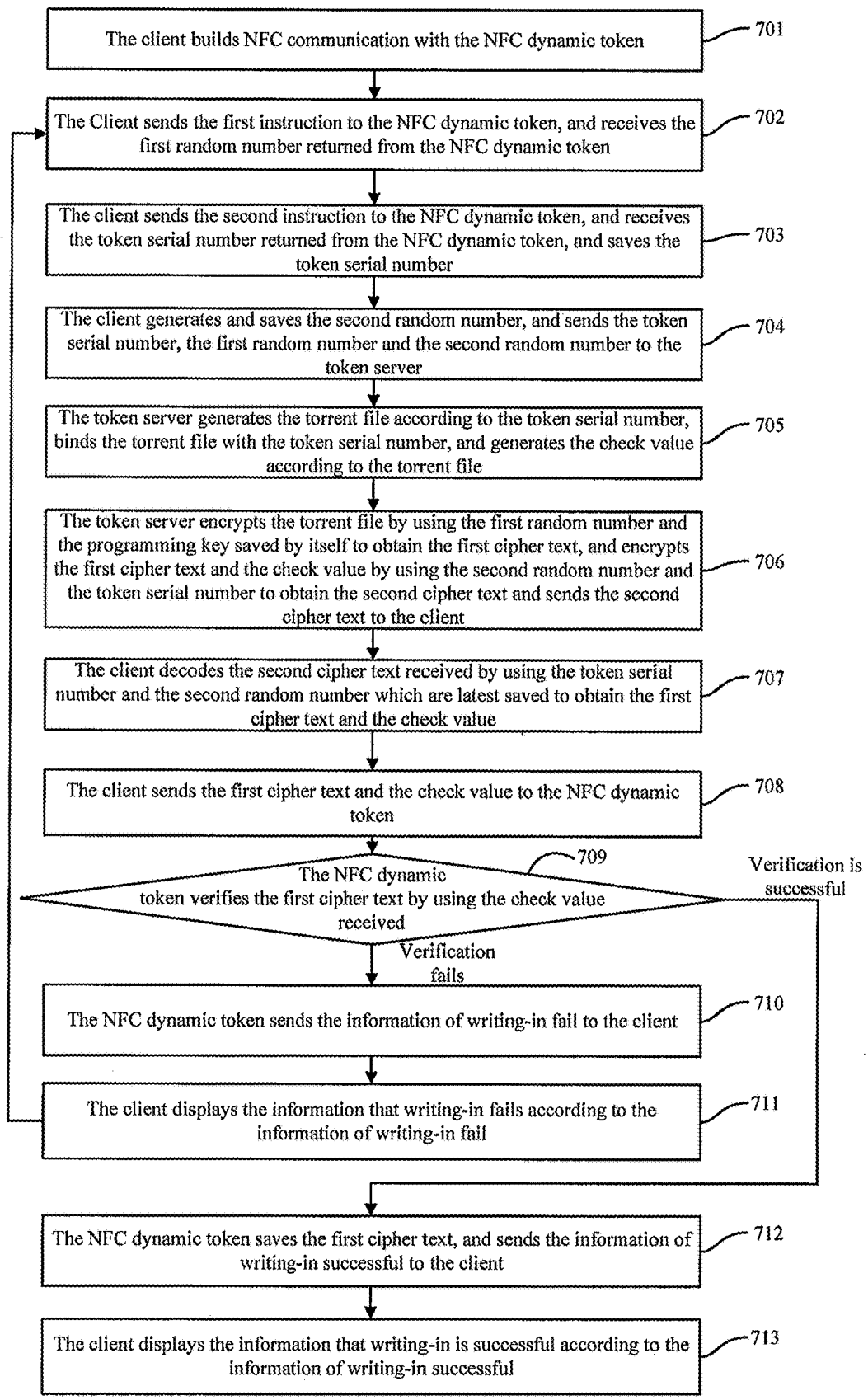
FIG. 7 shows a flow diagram of the third method for writing a seed key in the NFC dynamic token according to Embodiment 7 of the present invention.

It provides the third method for writing a seed key into a NFC dynamic token according to Embodiment 7 of the present invention, as shown in FIG. 7, which includes the following steps:

Step 701, the client builds NFC communication with the NFC dynamic token.

In this case, the client can equipped in a device with NFC function.

Step 702, the client sends the first instruction to the NFC dynamic token, and receives the first random number returned from the NFC dynamic token.

In this case, the first random number can be a part of data cut out from the number of seconds of utc by the NFC dynamic token, for instance, the clients sends the first instruction "0x44020110" to the NFC dynamic token, and receives the first random number "0x1326" returned from the NFC dynamic token.

It needs to note that the NFC dynamic token saves the first random number.

Step 703, the client sends the second instruction to the NFC dynamic token, and receives the token serial number which is returned from the NFC dynamic token, and saves the token serial number.

For instance, the client sends the second instruction "0x4402043A" to the NFC dynamic token, and receives the token serial number "15357" returned from the NFC dynamic token.

Step 704, the client generates and saves the second random number, and sends the token serial number, the first random number and the second random number to the token server.

In this case, the second random number can be the number of seconds of UTC or a part of data cut out from the number of seconds of UTC.

For instance, the client generates and saves the second random number "0x297A", and sends the token serial number "15357", the first random number "0x1326" and the second random number "0x297A" to the token server.

Step 705, the token server generates the torrent file according to the token serial number received, and binds the torrent file with the token serial number, and generates the check value according to the torrent file.

For instance, the token server generates the torrent file "0x8D5828922FEBFC8597" according to the token serial number "15357", and binds the torrent file" 0x8D5828922FEBFC8597" with the token serial number "15357", and generates the check value "0x6E4D" according to the torrent file.

Step 706, the token server encrypts torrent file by using the first random number and a programming key saved by the token server to obtain the first cipher text, and encrypts the first cipher text and the check value by using the second random number and the token serial number to obtain the second cipher text and sends the second cipher text to the client.

Specifically, the token server generates encryption key according to the second random number, and generates the initialization vector according to the token serial number, and encrypts the first cipher text and the check value by using the encryption key and the initialization vector to obtain the second cipher text.

In Embodiment 7, the token server can calculate a hash on the second random number and the preset value to obtain a hash value which is made as the encryption key; the token server calculates a hash on the token serial number and the preset value to obtain a hash value which is made as the initialization vector.

For instance, the token server encrypts the torrent file "0x8D5828922FEBFC8597" by using the first random number "0x1326" which is from the client to obtain the first cipher text "0xAFCC4F6EAC971346E6", and encrypts the first cipher text "0xAFCC4F6EAC971346E6" and the check value "0x6E4D" by using the second random number "0x297A" and the token serial number "15357" to obtain the second cipher text "0xD2361E54C863BD21CA".

Step 707, the client decodes the second cipher text received by using the token serial number and the second random which are latest saved to obtain the first cipher text and the check value.

Specifically, the client generates the encryption key according to the second random number which is latest saved, and generates the initialization vector according to the token serial number which is latest saved, and decodes the second cipher text by using the encryption key and the initialization vector to obtain the first cipher text and the check value.

In Embodiment 7, the client can calculate a hash on the second random number which is latest saved and the preset value to obtain a hash value which is made as the encryption key; the client calculates the token serial number which is latest saved and the preset value to obtain a hash value which is made as the initialization vector.

For instance, the client decodes the second cipher text "0xD2361E54C863BD21CA" by using the token serial number "15357" and the second random number "0x297A" to obtain the first cipher text "0xAFCC4F6EAC971346E6" and the check value "0x6E4D".

Step 708, the client sends the first cipher text and the check value to the NFC dynamic token.

For instance, the client sends the first cipher text "0xAFCC4F6EAC971346E6" and the check value "0x6E4D" to the NFC dynamic token.

Step 709, the NFC dynamic token verifies the first cipher text by using the received check value, goes to Step 710 in the case that the first cipher text is verified unsuccessfully; goes to Step 712 in the case that the first cipher text is verified successfully.

Specifically, the NFC dynamic token decodes the first cipher text received by using the programming key set in the NFC dynamic token and the first random number which is latest saved to obtain the torrent file, and calculates to obtain the check value according to the torrent file, and determines whether the check value which is obtained by calculating is same as the check value received, if yes, the verification is successful; otherwise, the verification fails.

In this case, the programming key set in the NFC dynamic token is same as the programming key saved in the token server.

For instance, the check value received by the NFC dynamic token is 0x6E4D, the NFC dynamic token decodes the first cipher text "0xAFCC4F6EAC971346E6" by using the first random number "0x1326" which is latest saved and the programming key which is set in the NFC dynamic token to obtain the torrent file "0x8D5828922FEBFC8597", and calculates to obtain the check value according to the torrent file, the verification is successful in the case that the check value which is obtained by calculating is 0x6E4D; otherwise, the verification fails.

Step 710, the NFC dynamic token sends the information of writing-in fail to the client.

For instance, the NFC dynamic token sends the information of writing-in fail "0xBB023D5B" to the client.

Step 711, the client displays the information that writing-in fails according to the information of writing-in fail, and returns to Step 702.

Step 712, the NFC dynamic token saves the first cipher text, and sends the information of writing-in successful to the client.

It needs to note that the NFC dynamic token can also decode the first cipher text by using the programming key set in the NFC dynamic token and the first random number which is latest saved after the NFC dynamic token saves the first cipher text to obtain the torrent file, and generates a dynamic password by using the torrent file.

For instance, the NFC dynamic token saves the first cipher text "0xAFCC4F6EAC971346E6", and sends the information of writing-in successful "0xBB02CCCC" to a mobile device via the NFC channel.

Step 713, the client displays the information that writing-in is successful according to the information of writing-in successful.

In Embodiment 7, a seed key is written into the NFC dynamic token via the NFC channel, in this way, the dynamic token is safer and more flexible.

Figure 8:
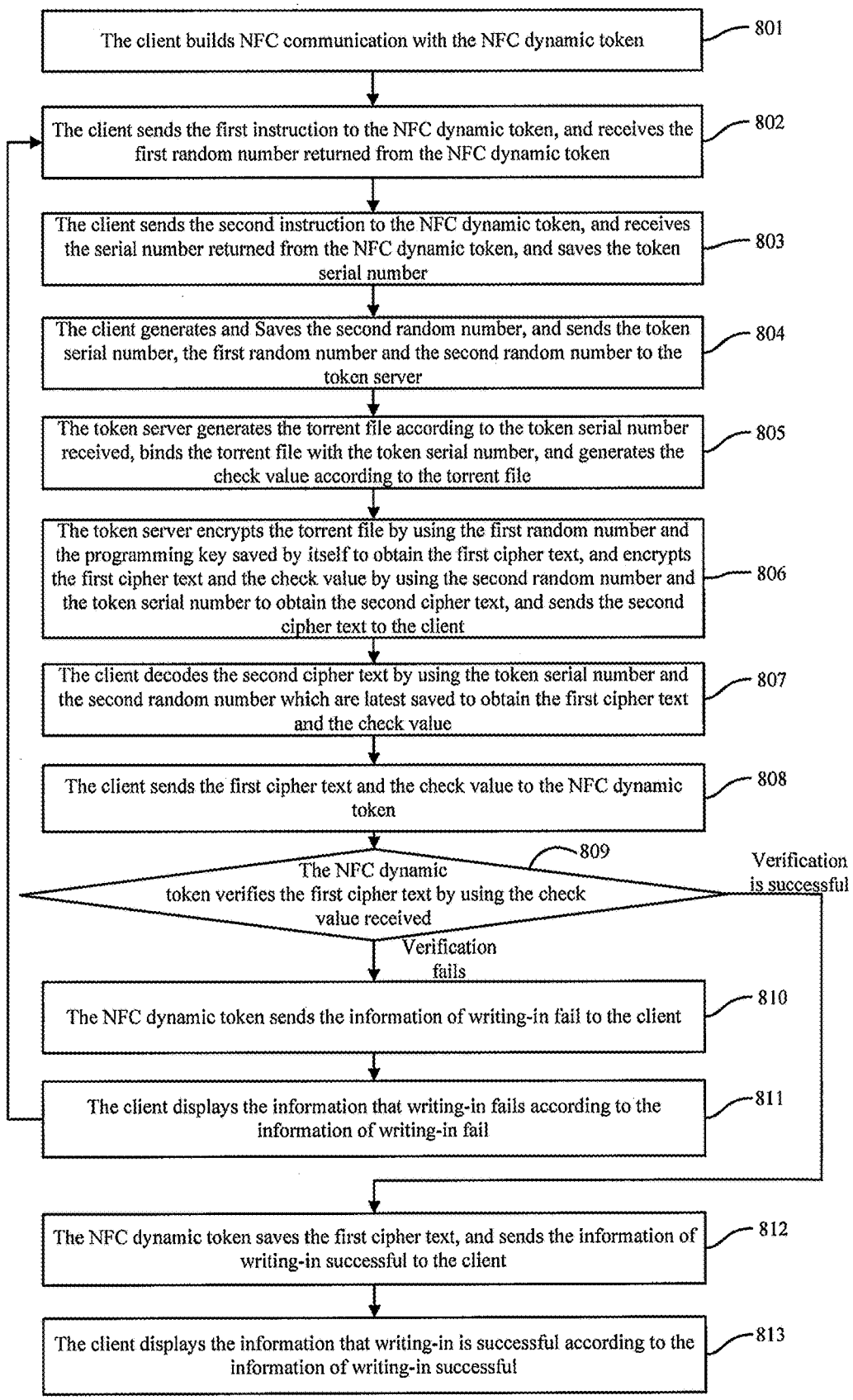
FIG. 8 shows a flow diagram of the fourth method for writing a seed key in the NFC dynamic token according to Embodiment 8 of the present invention.

It provides another method for writing a seed key into the NFC dynamic token according to Embodiment 8 of the present invention, as shown in FIG. 8, which includes the following steps:

Step 801, the client builds NFC communication with the NFC dynamic token.

In this case, the client can be equipped in a device with NFC function.

Step 802, the client sends the first instruction to the NFC dynamic token, and receives the first random number returned from the NFC dynamic token.

In this case, the first random number is data which is obtained by encrypting a random number by using the programming key set in the NFC dynamic token, the random number plaintext can be a part of data cut out from the number of seconds of UTC by the NFC dynamic token.

For instance, the client sends the first instruction "0x44020110" to the NFC dynamic token, and receives the first random number "0x5B79" returned from the NFC dynamic token.

It needs to note that the NFC dynamic token saves the random plaintext, the token server saves a programming key which is same as the programming key set in the NFC dynamic token.

Step 803, the client sends the second instruction to the NFC dynamic token, and receives the token serial number returned from the NFC dynamic token, and saves the token serial number.

For instance, the client sends the second instruction "0x4402043A" to the NFC dynamic token, receives the token serial number "15357" returned from the NFC dynamic token.

Step 804, the client generates and saves the second random number, and sends the token serial number, the first random number and the second random number to the token server.

In this case, the second random number can be the number of seconds of UTC or a part of data cut out from the number of seconds of UTC.

For instance, the client generates and saves the second random number "0x297A", and sends the token serial number "15357", the first random number "0x5B79" and the second random number "0x297A" to the token server.

Step 805, the token server generates the torrent file according to the token serial number received, and binds the torrent file with the token serial number, and generates the check value according to the torrent file.

For instance, the token server generates the torrent file "0x8D5828922FEBFC8597" according to the token serial number "15357", and binds the torrent file "0x8D5828922FEBFC8597" with the token serial number "15357", and generates the check value "0x6E4D" according to the torrent file.

Step 806, the token server decodes the first random number by using the programming key which is saved by the token server to obtain a random number plaintext, and encrypts the torrent file by using the random number plaintext to obtain the first cipher text, encrypts the first cipher text and the check value by using the second random number and the token serial number to obtain the second cipher text, and sends the second cipher text to the client.

Specifically, the token server the token server generates the encryption key according to the second random number, and generates the initialization vector according to the token serial number, and encrypts the first cipher text and the check value by using the encryption key and the initialization vector to obtain the second cipher text.

In Embodiment 8, the token server can calculate a hash on the second random number and the preset value to obtain a hash value which is made as the encryption key; the token server can calculate a hash on the token serial number and the preset value to obtain a hash value which is made as the initialization vector.

For instance, the token server decodes the first random number "0x5B79" by using the programming key saved by the token server to obtain the random number plaintext "0x1326", and encrypts the torrent file "0x8D5828922FEBFC8597" by using the random number plaintext "0x1326" to obtain the first cipher text "0xAFCC4F6EAC971346E6", and encrypts the first cipher text "0xAFCC4F6EAC971346E6" and the check value "0x6E4D" by using the second random number "0x297A" and the token serial number "15357" to obtain the second cipher text "0xD2361E54C863BD21CA".

Step 807, the client decodes the second cipher text by using the token serial number and the second random number which are latest saved to obtain the first cipher text and the check value.

Specifically, the client generates the encryption key according to the second random number which is latest saved, and generates initialization vector according to the token serial number which is latest saved, and decode the second cipher text received by using the encryption key and the initialization vector to obtain the first cipher text and the check value.

In Embodiment 8, the client can calculate a hash on the second random number latest saved and the preset value to obtain a hash value which is made as the encryption key; the client calculates a hash on the token serial number latest saved and the preset value to obtain a hash value which is made as the initialization vector.

For instance, the client decodes the second cipher text "0xD2361E54C863BD21CA" by using the token serial number "15357" and the second random number "0x297A" to obtain the first cipher text "0xAFCC4F6EAC971346E6" and the check value "0x6E4D".

Step 808, the client sends the first cipher text and the check value to the NFC dynamic token.

For instance, the client sends the first cipher text "0xAFCC4F6EAC971346E6" and the check value "0x6E4D" to the NFC dynamic token.

Step 809, the NFC dynamic token verifies the first cipher text by using the received check value, goes to Step 810 in the case that the first cipher text is verified unsuccessfully; goes to Step 812 in the case that the first cipher text is verified successfully.

Specifically, the NFC dynamic token decode the received first cipher text by using the random number plaintext latest saved to obtain the torrent file, and calculates to obtain the check value according to the torrent file, and determines whether the check value obtained by calculating is same as the check value received, if yes, the first cipher text is verified successfully; otherwise, the first cipher text is verified unsuccessfully.

For instance, the NFC dynamic token receives the check value "0x6E4D", and decode the first cipher text "0xAFCC4F6EAC971346E6" by using the random number plaintext "0x1326" which is latest saved to obtain the torrent file "0x8D5828922FEBFC8597", and calculates to obtain the check value according to the torrent file, if the check value which is obtained by calculating is "0x6E4D", the first cipher text is verified successfully; otherwise, the first cipher text is verified unsuccessfully.

Step 810, the NFC dynamic token sends the information of writing-in fail to the client.

For instance, the NFC dynamic token sends the information of writing-in fail "0xBB023D5B" to the client.

Step 811, the client displays information that writing in fails according to the information of writing-in fail, and returns to Step 802.

Step 812, the NFC dynamic token saves the first cipher text, and sends the information of writing-in successful to the client.

For instance, the NFC dynamic token saves the first cipher text "0xAFCC4F6EAC971346E6", and sends the information of writing-in successful "0xBB02CCCC" to the client via the NFC channel.

It needs to note that the NFC dynamic token decodes the first cipher text by using the random number plaintext which is latest saved after the first cipher text is saved by the NFC dynamic token to obtain the torrent file, and generates a dynamic password by using the torrent file.

Step 813, the client displays the information that writing-in is successful according to the received information of writing-in successful.

In Embodiment 8, the seed key is programmed into the NFC dynamic token via the NFC channel, in this way, the dynamic token is safer and more flexible.

Figure 9:
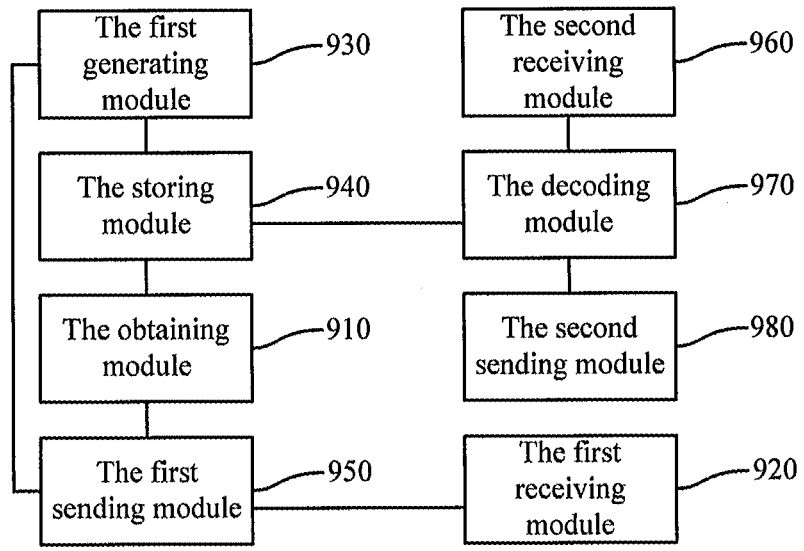
FIG. 9 shows a module chart of another client according to Embodiment 9 of the present invention.

It provides a client which is based on the above method for writing a seed key into a NFC dynamic token according to Embodiment 9, as shown in FIG. 9, which includes:

an obtaining module 910 which is configured to obtain the token serial number of the NFC dynamic token;

a first receiving module 920 which is configured to receives the first random number which is from the NFC dynamic token;

a first generating module 930 which is configured to generate the second random number;

a storing module 940 which is configured to save the token serial number and the second random number;

a first sending module 950 which is configured to send the token serial number, the first random number and the second random number to the token server;

a second receiving module 960 which is configured to receive the second cipher text from the token server;

a decoding module 970 which is configured to decode the second cipher text by using the token serial number and the second random number which are latest saved to obtain the first cipher text and the check value; and a second sending module 980 which is configured to send the first cipher text and the check value to the NFC dynamic token.

Furthermore, the client includes:

a third sending module which is configured to send a fourth instruction to the NFC dynamic token;

a third receiving module which is configured to receive token time information returned from the NFC dynamic token;

a second generating module which is configured to generate the token offset value according to the token time information and the server time information; and a fourth sending module which is configured to send the token offset value to the token server.

In this case, the first random can be data obtained by encrypting the random number plaintext by the NFC dynamic token which uses the programming key inset in the NFC dynamic token.

Furthermore, the first receiving module 920 is specifically configured to send the first instruction to the NFC dynamic token and receive the first random number returned from the NFC dynamic token.

Furthermore, the obtaining module 910 is specifically configured to send the second instruction to the NFC dynamic token and receive the token serial number returned from the NFC dynamic token.

Or, obtain the token serial number according to the user name.

Furthermore, the client further includes:

a displaying module which is configured to receive the information of writing-in fail from the NFC dynamic token, and display the information that writing-in fails; or, receive the information of writing-in successful from the NFC dynamic token and display the information that writing-in is successful.

In Embodiment 9, the seed key is programmed in the NFC dynamic token via the NFC channel, in this way, the dynamic token is safer and more flexible.

Figure 10:
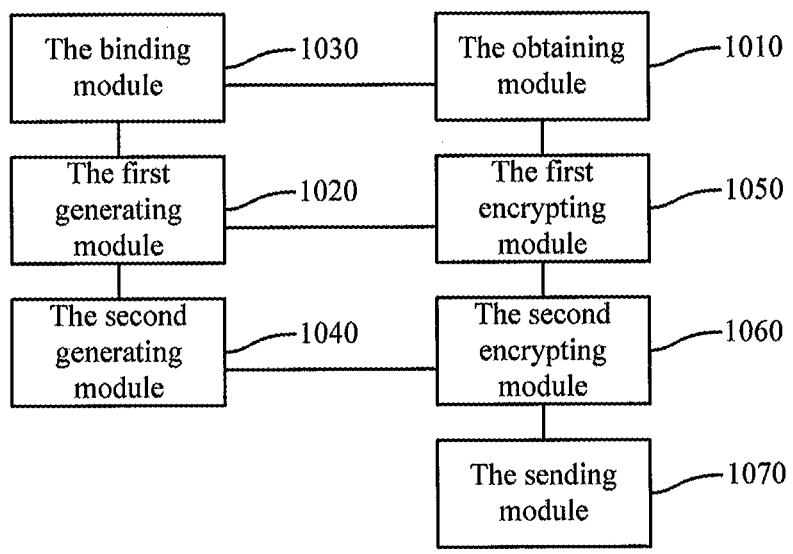
FIG. 10 shows a module chart of another client according to Embodiment 10 of the present invention.

It provides a token server which is based on the above method for writing a seed key into the NFC dynamic token according to Embodiment 10, as shown in FIG. 10, which includes:

an obtaining module 1010 which is configure to receive the token serial number, the first random number and the second random number from the client;

a first generating module 1020 which is configured to generate the torrent file according to the token serial number;

a binding module 1030 which is configured to bind the torrent file with the token serial number;

a second generating module 1040 which is configured to generate the check value according to the torrent file;

a first encryption module 1050 which is configured to encrypt the torrent file by using the first random number to obtain the first cipher text;

a second encryption module 1060 which is configured to encrypt the first cipher text and the check value by using the second random number and the token serial number to obtain the second cipher text; and a sending module 1070 which is configured to send the second cipher text to the client.

Furthermore, the token server further includes:

a first receiving module which is configured to receive the token offset value from the client;

the binding module 1030 is further configured to bind the torrent file with the token offset value.

In one embodiment of the present invention, the token server further includes:

a storing module which is configured to save the programming key;

correspondingly, the first encryption module 1050 is specifically configured to encrypt the torrent file by using the first random number and the programming key saved by the storing module to obtain the first cipher text.

In another embodiment of the present invention, the first random number is data which is obtained by encrypting the random number plaintext by using the programming key set in the NFC dynamic token by the NFC dynamic token;

The above token server further includes:

a storing module which is configured to save a programming key which is same as the programming key set in the NFC dynamic token;

correspondingly, the first encryption module 1050 is specifically configured to decode the first random number by using the programming key saved in the storing module to obtain the random number plaintext, and to encrypt the torrent file by using the random number plaintext to obtain the first cipher text.

the seed key is programmed in the NFC dynamic token via the NFC channel, in this way, the dynamic token is safer and more flexible.

A dynamic password generated by the NFC dynamic token is obtained via a NFC channel, and the dynamic password is sent to the token server for being authenticated, in this way, the dynamic token is safer because the method avoids an error or from being leaked when a user enters the dynamic password.

Embodiments of the present invention can be realized with hardware or software module, or both hardware and software. The software module can be inset in a RAM (Random Access Memory), a memory, a ROM (Read-Only Memory), an Electrical programmable ROM, an Electrically erasable and programmable ROM, a register, a hard disk, a removable disc, a CD-ROM or other storage medium which is known in the technological field.

The Embodiments described herein are just preferable Embodiments of the present invention. On the basis of the Embodiments of the invention, all other related Embodiments made by those skilled in the art without any inventive work belong to the scope of the invention.

The invention claimed is:

1. A method for authenticating a dynamic password, wherein said method comprises the following steps:

building, by a client, an NFC (Near Field Communication) communication with a NFC dynamic token in order to obtain a token serial number of the NFC dynamic token and a dynamic password from the NFC dynamic token;

encrypting, by the client, the dynamic password by using the token serial number and a random number stored by the client in order to obtain a cipher text, and sending the cipher text, the random number and the token serial number to the token server; and receiving, by the client, information of authenticating successful or information of authenticating unsuccessful returned from an application server.

2. The method as claimed in claim 1, wherein the client obtaining the token serial number of the NFC dynamic token specifically comprises:

sending, by the client, an instruction to the NFC dynamic token, and receiving the token serial number returned from the NFC dynamic token; or, obtaining, by the client, a corresponding token serial number according to a user name.

3. The method as claimed in claim 1, wherein, the client encrypting the dynamic password by using the token serial number and the second random number stored by the client in order to obtain the cipher text specifically comprises:

generating, by the client, an encryption key according to the random number, generating an initialization vector according to the token serial number, and encrypting the dynamic password by using the encryption key and the initialization vector in order to obtain the cipher text;

the client generating the encryption key according to the random number specifically comprises:

calculating, by the client, a hash on the random number and a preset value in order to obtain a hash value which is made as the encryption key; and the client generating the initialization vector according to the token serial number specifically comprises:

calculating, by the client, a hash on the token serial number and the preset value in order to obtain a hash value which is made as the initialization vector.

4. The method as claimed in claim 1, wherein said method further comprises a method for writing a seed key into a NFC dynamic token comprising the following steps:

obtaining, by the client; the token serial number of the NFC dynamic token, receiving a first random number from the NEC dynamic token, generating a second random number, saving the token serial number and the second random number, and sending the token serial number, the first random number and the second random number to the token server;

receiving, by the client, a cipher text from the token server, and decoding the cipher text by using the token serial number and the second random number which are latest saved in order to obtain a first cipher text and a check value; and sending, by the client, the first cipher text and the check value to the NFC dynamic token.

5. The method as claimed in claim 4, wherein the first random number is data obtained by encrypting a random number plaintext by the NFC dynamic token using a programming key inset in the NFC dynamic token.

6. A client, wherein said client comprises
a memory and a processor configured to perform the following steps:

building NFC (Near Field Communication) communication with a NFC dynamic token;

obtaining a token serial number of the NFC dynamic token;

obtaining a dynamic password from the NFC dynamic token;

saving a random number;

encrypting the dynamic password by using the token serial number and the random number so as to obtain a cipher text;

sending the cipher text, the random number and the token serial number to a token server; and receiving information of authenticating successful or information of authenticating unsuccessful from the application server.

7. The client as claimed in claim 6, wherein said client further comprises the steps of:

receiving a first random number from the NFC dynamic token;

generating a second random number;

storing the token serial number and the second random number;

sending the token serial number, the first random number and the second random number to the token server;

receiving a second cipher text from the token server;

decoding the second cipher text by using the token serial number and the second random number which are latest saved so as to obtain the first cipher text and the check value; and sending the first cipher text and the check value to the NFC dynamic token.

8. The client as claimed in claim 7, wherein encrypting comprises:

generating an encryption key according to a second random number;

generating an initialization vector according to a token serial number; and encrypting a dynamic password by using the encryption key and the initialization vector so as to obtain the third cipher text.

9. The client as claimed in claim 8, further comprising
generating is specifically configured to calculate a hash on the second random number and a preset value so as to obtain the hash value which is made as the encryption key; and the second generating is specifically configured to calculate a hash on the token serial number and the preset value so as to obtain the hash value which is made as the initialization vector.

* * * * *